No. 608,649.  
L. CHRISTIANSEN.  
TUMBLER, JUG, OR SIMILAR VESSEL.  
(Application filed Apr. 29, 1897.)  
Patented Aug. 9, 1898.
(No Model.)
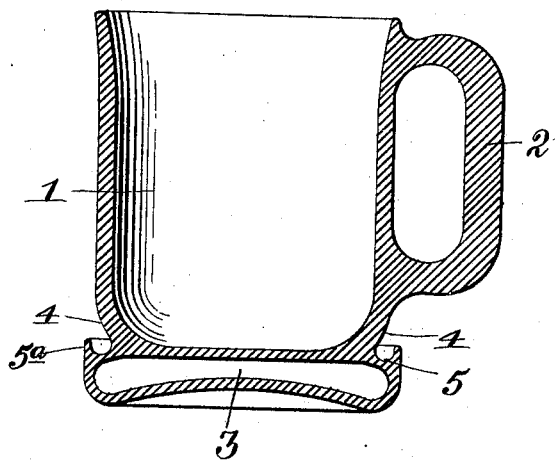
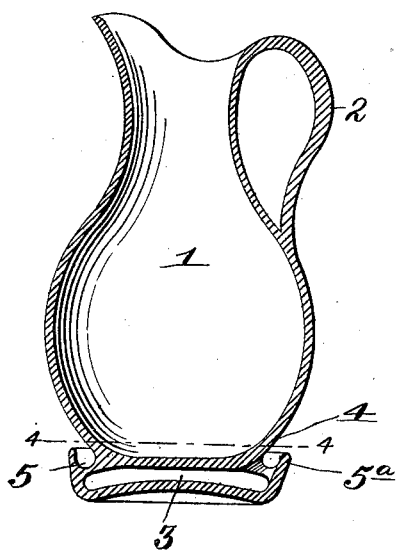
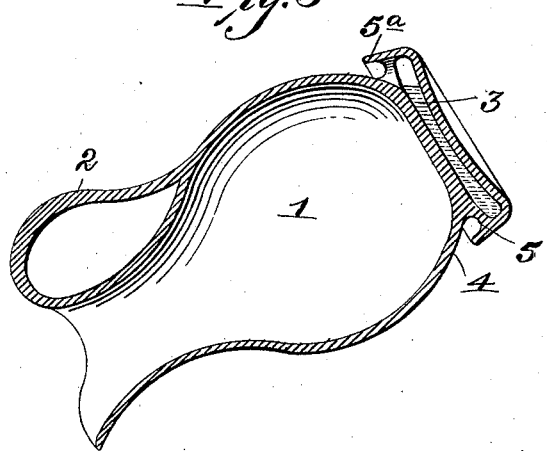
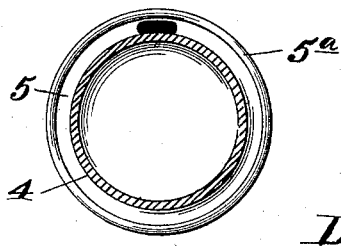
Witnesses  
Wm H. Edwards,  
Victor J. Evans
Inventor  
Ludwig Christiansen  
By John Wedderburn, Attorney

United States Patent Office.

LUDWIG CHRISTIANSEN, OF SEASIDE, OREGON.

TUMBLER, JUG, OR SIMILAR VESSEL.

SPECIFICATION forming part of Letters Patent No. 608,649, dated August 9, 1898.

Application filed April 29, 1897. Serial No. 634,331. (No model.)

*To all whom it may concern:*

Be it known that I, LUDWIG CHRISTIANSEN, of Seaside, in the county of Clatsop and State of Oregon, have invented certain new and useful Improvements in Tumblers, Jugs, or Similar Vessels; and I do hereby declare the following to be a full, clear, and exact description of the invention, such as will enable others skilled in the art to which it appertains to make and use the same.

This invention relates to certain improvements in vessels adapted to contain liquids of various kinds and from which the contents may be drunk, the object being to provide means whereby the liquid after being poured therefrom may be prevented from dripping down upon the outside and soiling the table-linen or the garments of the user.

The invention comprises certain novel features of construction and arrangement of parts whereby the above and other important advantages are attained and whereby it is made simpler and better adapted for the purposes for which it is intended, as will be hereinafter fully described, and specifically defined in the appended claims.

In the accompanying drawings, Figure 1 represents a central vertical section of a mug or tumbler constructed in accordance with my invention. Fig. 2 is a similar view of an ordinary jug. Fig. 3 is a similar view, but showing the jug tilted to a position where its contents may be completely emptied; and Fig. 4 is a section on the line 4 4 of Fig. 2.

Similar reference-numerals indicate corresponding parts in all figures of the drawings.

1 represents the body of the vessel, which may be of any desired ornamental or usual construction, shown in this instance, however, as substantially cylindrical in form and provided with a handle 2, which forms a convenient means for raising the vessel to the lips.

3 represents a chamber located beneath the bottom proper of the vessel and closely following the contour thereof and preferably arranged having a slight rise at its intermediate lower portion, although this rise may be entirely dispensed with and the bottom may be perfectly flat. The lower outer extremity of the bottom of the vessel curves inwardly, as at 4, for a short distance, where it again turns outwardly and upwardly and forms a trough or annular groove 5, the outer wall $5^a$ of which projects slightly beyond the outer face of the vessel, and this groove or trough is inclined upwardly toward an opening or openings through which the liquid may drain into the chamber 3 as it overflows or drips down the outside of the vessel.

In the construction shown in Fig. 1 I prefer to arrange this opening at one side of the vessel and at the side opposite that from which the contents will be discharged, so that as the vessel is tilted for that purpose the liquid which may have previously drained into the chamber will not discharge through the opening, and thus soil the clothes of the user.

In Figs. 2 and 3 I have shown practically the same construction of chamber; but in this instance the vessel is an ordinary water or milk pitcher and, as will be observed, the opening through which the liquid may drain in the chamber is located in a direct line with the handle, so that as the jug is tilted to discharge its contents, as shown in Fig. 3, the liquid which may have previously drained into the chamber will not pass out through the opening, as will be readily understood.

While I have shown my invention as applied to vessels adapted to contain water or other liquids for consumption, it must be understood that the arrangement may be found advantageous when applied to oil-cans and similar vessels, as will be readily apparent.

It will thus be seen that my invention provides in a simple and inexpensive manner a vessel which will absolutely prevent the liquid from dropping on the clothes of the user or upon the table-linen, and when constructed for use in connection with oil-cans will effectually catch all oil that may lodge upon the outside of the vessel after use.

Modifications may be made without departing from the essential features of my invention, and I do not wish to be understood as limiting myself to the precise details of construction herein shown and described, but reserve the right to make such changes and alterations therein as may fairly fall within its spirit and scope.

Having thus described my invention, what I claim as new, and desire to secure by Letters Patent, is—

1. A vessel having a chamber beneath the bottom thereof provided with an opening at one point and closed at all other points.

2. A vessel having a chamber located beneath the bottom thereof, and a trough upon the outside of said vessel above said chamber, the said chamber having an opening leading thereinto from the trough at the rear and closed at all other points.

In testimony whereof I have signed this specification in the presence of two subscribing witnesses.

LUDWIG CHRISTIANSEN.

Witnesses:
R. RASMUSSEN,
JOHN WIREN.